United States Patent
Hensler et al.

(10) Patent No.: US 11,870,695 B1
(45) Date of Patent: Jan. 9, 2024

(54) VIRTUAL MACHINE MIGRATION ON HYPERVISOR NETWORK

(71) Applicant: Microsoft Technology Licensing, LLC, Redmond, WA (US)

(72) Inventors: Kenyon James Hensler, Acworth, GA (US); Rupesh Bhagaban Patro, Redmond, WA (US); Aishwarya Srinivasa Raghavan, Sammamish, WA (US); Shivjit Satish Patil, Chapel Hill, NC (US); Rangaprasad Narasimhan, Sammamish, WA (US); Anand Ramakrishna, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/067,564

(22) Filed: Dec. 16, 2022

(51) Int. Cl.
*G06F 15/16* (2006.01)
*H04L 45/76* (2022.01)
*G06F 9/455* (2018.01)
*H04L 45/42* (2022.01)

(52) U.S. Cl.
CPC .......... *H04L 45/76* (2022.05); *G06F 9/45558* (2013.01); *H04L 45/42* (2013.01); *G06F 2009/45595* (2013.01)

(58) Field of Classification Search
CPC ..... H04L 45/42; H04L 45/76; G06F 9/45558; G06F 2009/45595
USPC ...................................................... 709/238
See application file for complete search history.

(56) References Cited

U.S. PATENT DOCUMENTS

| | | | | |
|---|---|---|---|---|
| 9,164,795 B1* | 10/2015 | Vincent | ............... | H04L 12/4633 |
| 9,197,489 B1* | 11/2015 | Vincent | ................ | H04L 67/148 |
| 9,397,943 B2* | 7/2016 | Song | ....................... | H04L 45/12 |
| 9,537,824 B2* | 1/2017 | Jungck | ................ | H04L 61/4511 |
| 9,781,052 B2* | 10/2017 | Narayanasamy | ... | H04L 65/1066 |
| 9,880,870 B1* | 1/2018 | Danilov | .............. | G06F 9/45558 |
| 9,928,107 B1* | 3/2018 | Vincent | ................ | G06F 9/5077 |
| 10,310,886 B2* | 6/2019 | Zhang | .................... | H04L 61/256 |
| 10,725,833 B2* | 7/2020 | Qi | ........................... | G06F 9/505 |
| 10,880,266 B1* | 12/2020 | Shribman | ............... | H04L 67/01 |
| 10,887,386 B2* | 1/2021 | Han | .................... | H04L 43/0817 |
| 11,190,374 B2* | 11/2021 | Shribman | ........... | H04L 12/2856 |
| 11,360,799 B2* | 6/2022 | Liu | ..................... | G06F 9/45558 |

* cited by examiner

*Primary Examiner* — Moustafa M Meky
(74) *Attorney, Agent, or Firm* — Alleman Hall Creasman & Tuttle LLP (57) ABSTRACT

A distributed computing system is provided, including a source computing device implementing a source hypervisor executing a virtual machine, a source-side router coupled to the source hypervisor, a destination computing device implementing a destination hypervisor, and a destination-side router coupled to the destination hypervisor. The source hypervisor is connected to the destination hypervisor through a network. During a migration of the virtual machine from the source hypervisor to the destination hypervisor, the source-side router duplicates packets ingressing into the source-side router. The duplicated packets include a first set of packets and a second set of packets, where the first set of packets is routed to the virtual machine through the source hypervisor on the network, and the second set of packets is routed to the virtual machine through the destination hypervisor on the network.

20 Claims, 6 Drawing Sheets

VIRTUAL MACHINE MIGRATION ON HYPERVISOR NETWORK

BACKGROUND

Modern distributed computing systems provide a plurality of computing devices that communicate with one another across computer networks. Such distributed computing systems may offer a variety of services that enable clients to develop and deploy applications in the cloud. In a virtualized environment, virtual machines, in which software applications and other code may be executed, are managed by hypervisors executing on computing devices. Some virtual machines may migrate from one hypervisor to another hypervisor, for example due to insufficient resources at the source hypervisor or degradation in source hypervisor functioning. A virtual machine may have performance or availability requirements whose satisfaction may be challenged by its migration, however. For example, packet losses may occur to packet transmissions being sent to the virtual machine while the virtual machine is migrating from one hypervisor to another hypervisor.

SUMMARY

A distributed computing system is provided, including a source computing device implementing a source hypervisor executing a virtual machine, a source-side router coupled to the source hypervisor, a destination computing device implementing a destination hypervisor, and a destination-side router coupled to the destination hypervisor. The source hypervisor is connected to the destination hypervisor through a network. During a migration of the virtual machine from the source hypervisor to the destination hypervisor, the source-side router duplicates packets ingressing into the source-side router. The duplicated packets include a first set of packets and a second set of packets, where the first set of packets is routed to the virtual machine through the source hypervisor on the network, and the second set of packets is routed to the virtual machine through the destination hypervisor on the network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1A:
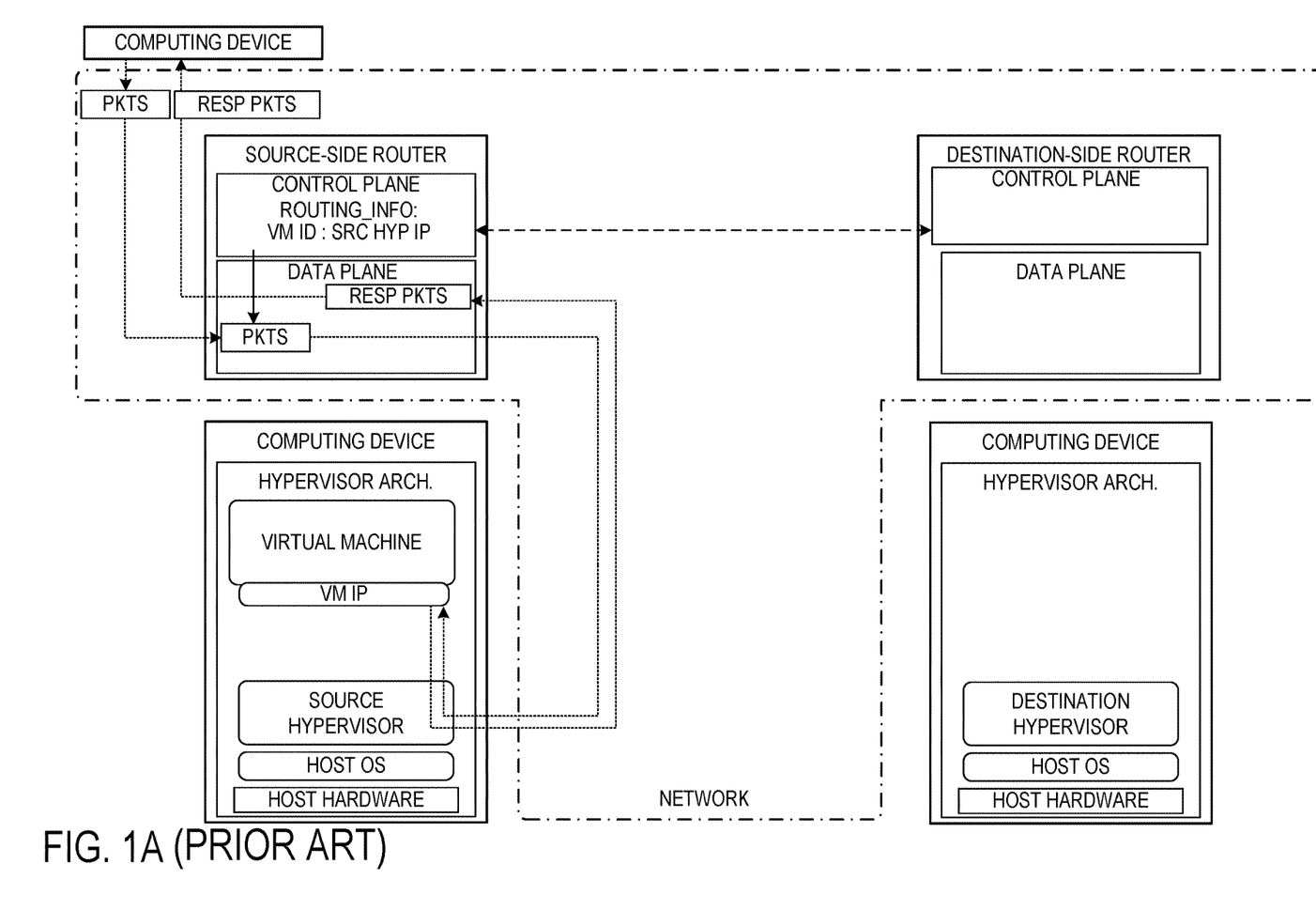
FIGS. 1A-1C illustrate a conventional modern distributed computing system with virtual machines that migrate between hypervisors over a network, and the technical problem of dropped packets during virtual machine migration.

As shown in FIG. 1A, a conventional modern distributed computing system includes a plurality of computing devices that communicate with one another across a computer network. Such a distributed computing system may offer a variety of services that enable clients to develop and deploy applications in the cloud. In a virtualized environment, computing devices in such a conventional distributed computing system implement hypervisors that manage virtual machines in which software applications and other code may be executed.

Figure 1B:
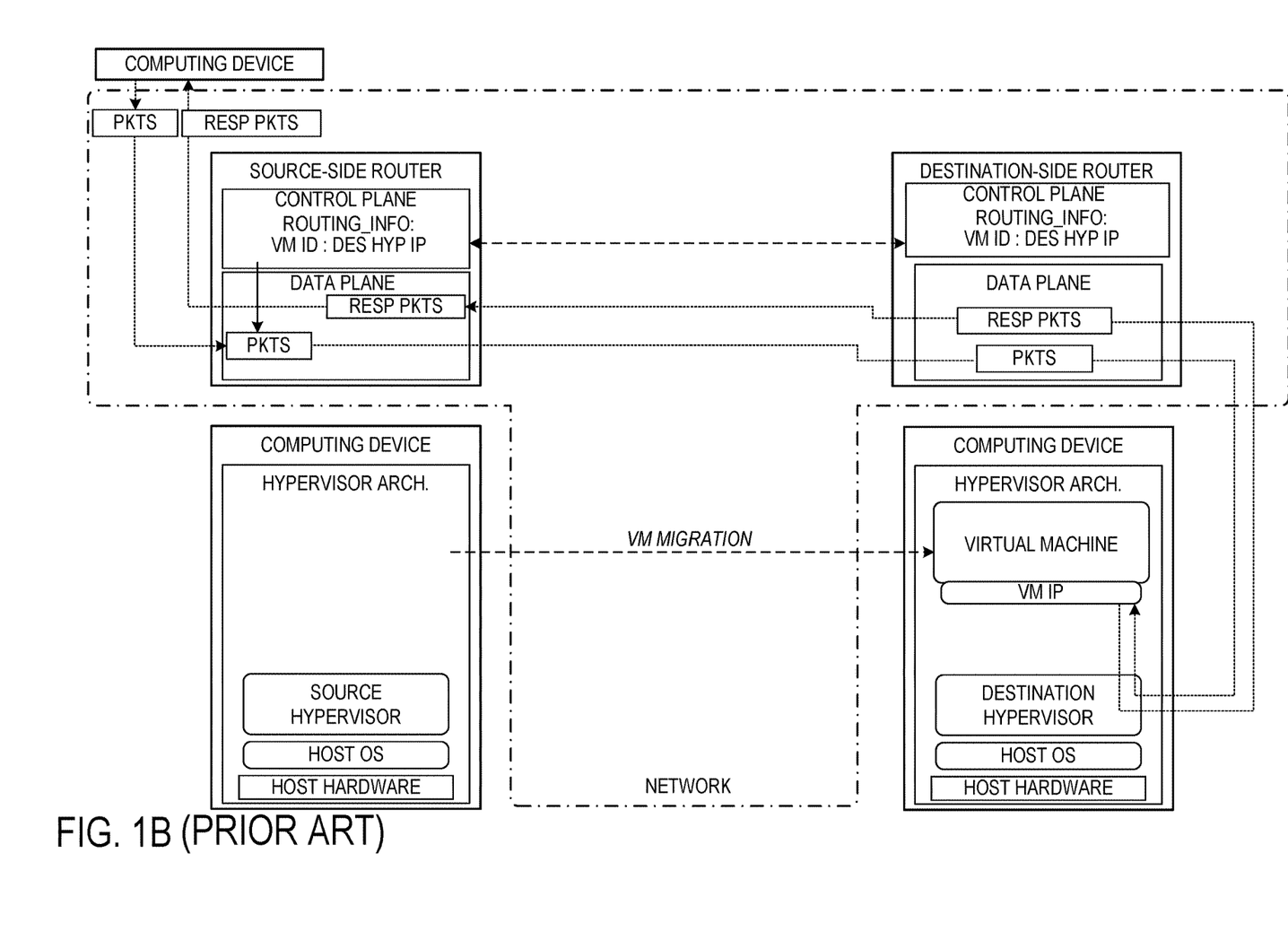

Turning now to FIG. 1B, which also illustrates the conventional distributed computing system of FIG. 1A, various factors may arise that prompt a virtual machine to migrate from one hypervisor implemented at one computing device to another hypervisor implemented at another computing device, as shown in dashed lines labeled VM MIGRATION. Such factors may include insufficient computing resources at the source hypervisor or computing device on which the source hypervisor is hosted, or degradation in the functioning of the source hypervisor. Following the migration, the virtual machine is under the control of the hypervisor at the second computing device, which has a different IP address. The routing information accessible to the control plane is updated after the migration has been completed.

Figure 1C:
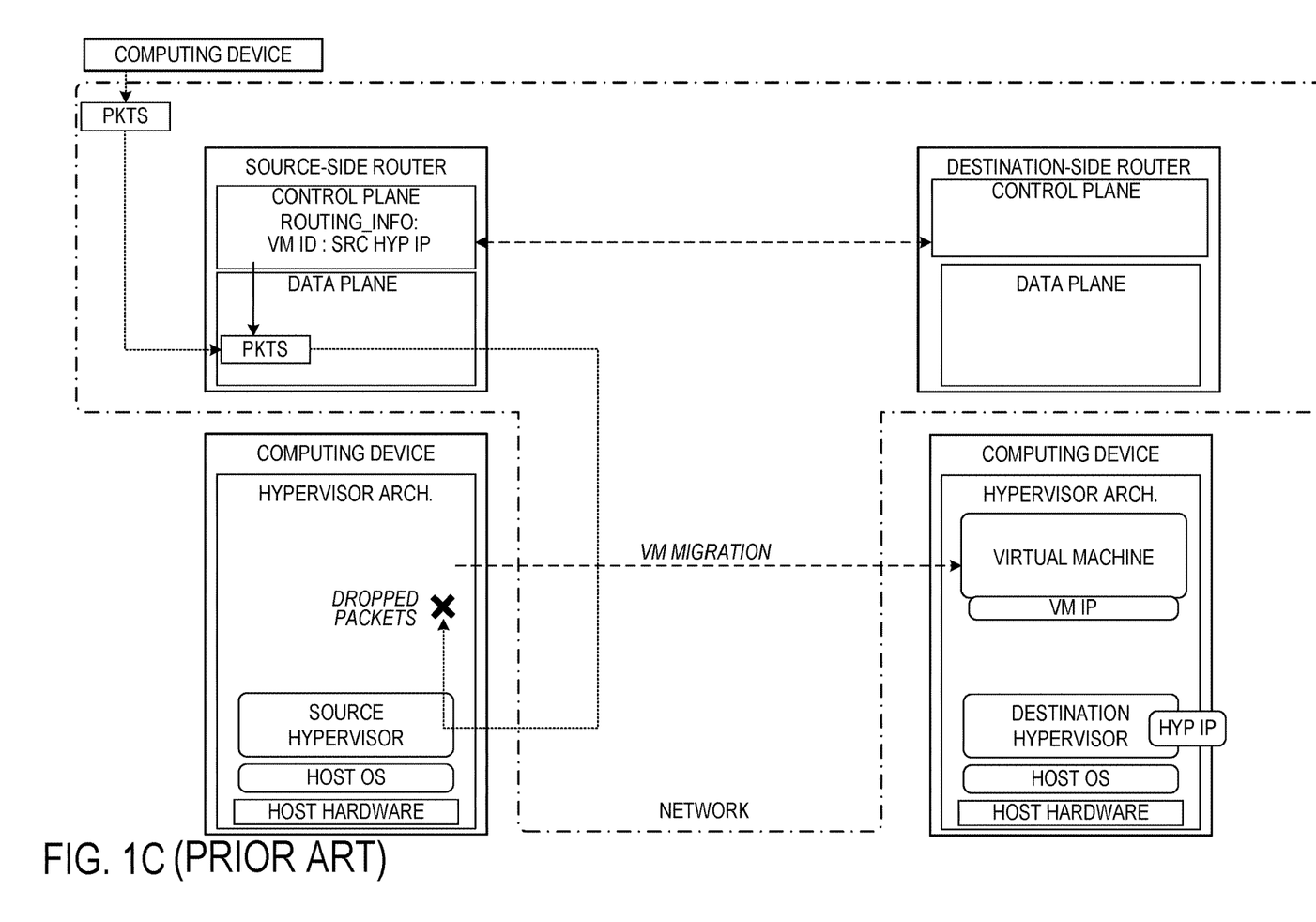

However, as shown in FIG. 1C, one challenge with the technical implementation of such a distributed computing system of FIGS. 1A and 1B is that, after the completion of the migration of the virtual machine from one hypervisor to the other hypervisor, updates to routing information may not occur in time to prevent dropped packets. This may leave a window of time when the virtual machine is instantiated at the post-migration host, but the routing information is out of date and points to the original host computing device. As shown in a dotted line, this can result in packets being sent to the incorrect host computing device and being dropped since that original host device no longer hosts the virtual machine. Updating the routing information to reflect the migration in sufficient time for network traffic to be properly routed to the destination hypervisor where the virtual machine is located post-migration may be impossible or impracticable, making dropped packets or delays after virtual machine migration virtually inevitable in such conventional distributed computing systems. This may degrade the performance of the virtual machine or cause the virtual machine to fail to meet availability requirements.

Figure 2:
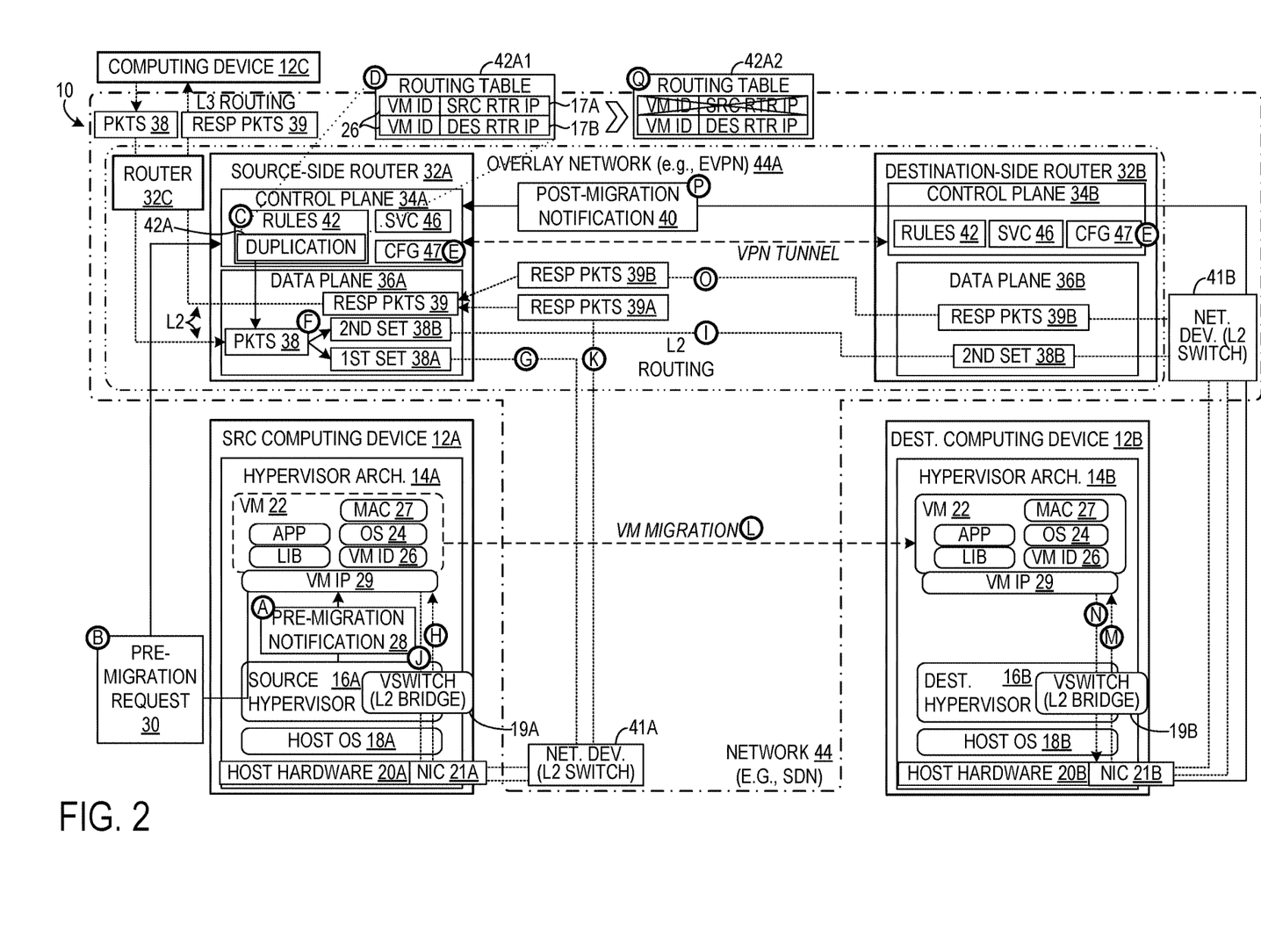
FIG. 2 shows a schematic view of a distributed computing system according to an example configuration of present disclosure.

To address these issues, FIG. 2 depicts an example distributed computing system 10 that includes a plurality of computing devices 12A, 12B, 12C configured to provide a virtualized environment in which a virtual machine may be migrated between computing devices 12A, 12B without dropping packets originating from computing device 12C due to the migration. To this end, a source computing device 12A implements a hypervisor architecture 14A that includes a source hypervisor 16A executed on a host operating system (OS) 18A. Host OS 18A is in turn executed on the host hardware 20A, which includes a processor and memory. The source hypervisor 16A provides a software interface between host OS 18A and a source-side router 32A, and between the host OS 18A and a virtual machine 22 that is executed on the source hypervisor 16A. Further, the virtual machine 22 includes a guest OS instance 24, a virtual machine identifier 26, a MAC address 27, as well as libraries, binaries, and other data used by applications executed within the virtual machine 22. In some implementations, however, host OS 18A may be omitted. The virtual machine ID 26 may be comprised of a concatenation of the MAC address 27 and VM IP address 29, in one specific example. Other forms of virtual machine ID 26 are also contemplated, such as a GUID.

Likewise, a destination computing device 12B implements a hypervisor architecture 14B that includes a destination hypervisor 16B executed on a host OS 18B. Host OS 18B is in turn executed on host hardware 20B, which includes a processor and memory. The destination hypervisor 16B provides a software interface between host OS 18B and the destination-side router 32B, and between the host OS 18B and the virtual machine 22 that is executed on the destination hypervisor 16B following the completion of the migration. In some implementations, host OS 18B may be omitted.

Computing device 12C typically is another computing device within the distributed computing system 10, executing a virtual machine or other software client that originates the packets 38. Alternatively, computing device 12C may be an external computing device that is outside the distributed computing environment, such as a client computing device communicating over the Internet with the distributed computing system 10. The packets 38 are typically packetized using TCP/IP and sent using IPv4 or IPv6 protocols, and may contain HTTP requests and responses, as one example.

Packets that ingress in requests from the computing device 12C are routed via OSI Level 3 (L3) routing protocols through routers in the network 44 to a router 32C in the overlay network 44A, which in one embodiment is configured in an Ethernet Virtual Private Network (EVPN) configuration. It will be appreciated that when the overlay network 44A is a virtual private network such as an EVPN, the router IP addresses are VPN tunnel endpoint (TEP) addresses. The EVPN L2 control plane contains routing tables 42A1 that are used to route packets from tunnel endpoint to tunnel endpoint of the routers in the EVPN. Thus, ingressing packets are inspected for the VM ID at the router 32C, and then routed within the EVPN from router 32C to the source-side router 32A having the source router IP address in the routing table for the VM ID, using the routing information in the EVPN L2 control plane. The EVPN L2 control plane configures routes between each router and the virtual machines 22 executed on the host computing devices 12A, 12B that are attached to each router, using the routing tables 42A1 that include the target virtual machine identifier (e.g., concatenation of IP & MAC addresses) and the corresponding router IP address (e.g., VPN tunnel endpoint addresses). With this routing information, ingressing packets are routed to the appropriate host computing device, and response packets make their way back to the requesting computing device, as shown in dotted lines.

In the illustrated example of FIG. 2, a virtual machine 22 migrates from a source computing device 12A in the distributed computing system 10 to a destination computing device 12B through the network 44. The network 44 may be implemented as a software defined network (SDN) in one example, and as discussed above may contain an overlay network such as an EVPN 44A. When not implemented as a software defined network, each of the source-side router 32A and destination-side router 32B, discussed below, are typically contained within their own respective L3 networks.

Before the migration, the virtual machine 22 is attached to a source hypervisor 16A executed on the source computing device 12A. This attachment is registered in a database accessible to the control plane of the software defined network 44 and overlay network 44A. The particular process involved in the virtual machine migration depends on the migration type. A network migration involves fully shutting down the virtual machine after notifying the services on which it depends, then transferring a copy of the entirety of data used by the virtual machine to the destination device, and booting up the virtual machine on the destination device. Other types of migration save the virtual machine in a suspended state and transfer the suspended state virtual machine, saving the time of shutting down the virtual machine completely. Yet other types of migration utilize virtualized storage and only migrate the virtual machine itself and not its stored data. After migration, the virtual machine communicates out through the hypervisor. Throughout this migration process, the routing table 42A1 maintains the entries that identify the virtual machine 22 as being attached to the source hypervisor 16A and the destination hypervisor 16B, even though the virtual machine 22 is not actually attached to each throughout the entire migration process. This ensures that the packets will be sent in duplicate to each of the source hypervisor 16A and destination hypervisor 16B throughout the entire migration, to avoid packet drop. It will be appreciated that the source-side router 32A and the destination-side router 32B may be part of any type of physical or virtual networking infrastructure by which the source hypervisor 16A and the destination hypervisor 16B can communicate.

Various factors may prompt the migration of the virtual machine in the distributed computing system 10 from the source computing device 12A to the destination computing device 12B. Such factors may include insufficient computing resources at the source computing device 12A, or source hypervisor 16A managing the virtual machine 22, to support the functioning of the virtual machine 22, and/or degradation in the functioning of the source computing device 12A or the source hypervisor 16A. Based upon one of these factors, or others, service level components within the distributed computing system itself or control logic under the control of a subscriber who has an account with the distributed computer system 10 can initiate a request to the source hypervisor 16A to migrate the virtual machine 22.

As discussed in detail below, during a migration of the virtual machine from the source hypervisor 16A to the destination hypervisor 16B, the source-side router 32A duplicates packets 38 ingressing into the source-side router 32A, such that the duplicated packets comprise a first set of packets 38A and a second set of packets 38B. The first set of packets 38A is routed to the virtual machine 22 through the source hypervisor 16A on the network, and the second set of packets is routed to the virtual machine 22 through the destination hypervisor 16B on the network 44.

In detail, once a migration request is received from a software component at the hypervisor 16A as described above, at (A) the source hypervisor 16A initiates the migration process by sending a pre-migration notification 28 to the virtual machine 22 which is executed on the source hypervisor 16A. At (B), responsive to receiving the pre-migration notification 28, the virtual machine 22 sends a request 30 to the source-side router 32A to initiate a migration service 46 on the source-side router 32A to duplicate the packets 38 ingressing into the source-side router 32A from computing device 12C, which are bound for the virtual machine 22. As discussed above, the source-side router 32A and destination-side router 32B may each be implemented as parts of an EVPN, for example.

Responsive to the virtual machine 22 sending the migration service 46 on the source-side router 32A the pre-migration notification request, at (C) the source-side router 32A initiates the migration service 46 and sets up and executes rules 42 for the treatment of the packets 38. The rules 42 are subsequently shared with the destination-side router 32B, so that the same migration service 46 is called and the rules 42 set up on the instantiated control plane 34B of the destination-side router 32B. Prior to a virtual machine migration, the routing table 42A1 typically includes a single entry for the VM ID and one router IP address. To facilitate a migration in response to receiving the pre-migration request, at (D), duplication rules 42A of rules 42 are implemented in the routing table 42A1 on the control plane 34A of the source-side router 32A and/or the control plane 34B of the destination-side router 32B, with table entries specifying the mapping between the source-side router IP address 17A and the VM ID 26, and the destination-side router IP address 17B and the VM ID 26, for the virtual machine 22 to which the packets 38 were sent, which is being migrated. Specifying the routing information in the routing tables in this way ensures packets bound for a particular VM are sent to both the pre-migration host computing device and post-migration host computing device throughout the duration of the migration. The duplication rule 42A of rules 42 contains logic to duplicate the packets 38 ingressing into the source-side router 32A so that the packets 38 become a first set of packets 38A and a second set of packets 38B, the first and second sets of packets 38A, 38B being duplicates of each other. Duplicate packets have the same payload, but may have different header information or metadata to account for the different routing of those duplicate packets.

Further, as shown at (E), the overlay network (e.g., EVPN network) 44A is configured via configuration setting 47 to be in a multi-homing configuration in which virtual machine 22 is registered as being attached to the source hypervisor 16A and the destination hypervisor 16B concurrently. The multi-homing configuration setting 47 may be set responsive to the virtual machine 22 receiving the pre-migration notification 28. However, it will be appreciated that this configuration is a fiction, since the virtual machine 22 is not actually concurrently attached to both hypervisors. The technical effect of this multi-homing configuration setting 47 is that the destination-side router will not return the second set of packets 38B upon receipt prior to the instantiation of the virtual machine 22 on the destination hypervisor 16B, and instead will presume that the virtual machine is in fact instantiated on the destination hypervisor 16B and thus will forward the received second set of packets 38B to the destination hypervisor. This ensures that, once instantiated at the destination computing device 12B, the virtual machine will receive any duplicated packets not received when instantiated at the first computing device 12A.

In accordance with the rules 42, as shown at (G), the source-side router 32A forwards the first set of packets 38A through the overlay network data plane 36A of the source-side router 32A, through the networking device 41A and network interface card 21A and virtual switch or L2 bridge of the source hypervisor 16A, which forwards the packets, as shown at (H) to the virtual machine 22 if it is instantiated on the source computing device 12A. Also in accordance with the rules 42, as shown at (I), the source-side router 32A forwards the second set of packets 38B over the overlay network data plane 36B through the destination-side router 32B, through the network interface card 21B to the virtual switch or L2 bridge of the destination hypervisor 16B, which in turn, as shown at (M), forwards the packets to the virtual machine 22 if it is instantiated on the destination computing device 12B. Logic in the EVPN control plane creates routes for these routing paths from each router to the virtual switch for each hypervisor.

As shown at (J), prior to migration of the virtual machine at (L), the virtual machine is instantiated at the source computing device 12A, and thus the virtual machine receives the packets 38 at (H), performs appropriate processing, and sends a first set of response packets 39A at (J) back through the virtual switch or L2 bridge 19A, networking device 41A and, as shown at (K), to the source-side router 32A. The first set of response packets 39A are forwarded to the client device 12A as packets 39 by the source-side router 32A and router 32C. The rules 42 also configure the source-side router 32A and the destination-side router 32B to maintain the indication of the attachment of the virtual machine 22 to each of the source and destination hypervisors 16A, 16B by maintaining the table entries for the source-side and destination-side routers 32A, 32B IP addresses 17A, 17B in the routing table 42A1 for the virtual machine 22, during an entire duration of the migration of the virtual machine 22 from the source hypervisor 16A to the destination hypervisor 16B. Thus, the routing table entries for both source-side router IP address 17A and the destination-side router IP address 17B remain throughout the virtual machine migration.

At (L), the virtual machine is migrated to the destination computing device 12B, and torn down or deleted from the source computing device 12A. After the virtual machine 22 is deleted from the source computing device 12A and thus no longer attached to the source hypervisor 16A, the first set of packets 38A will continue to be transmitted to the source hypervisor 16A according to the duplication rule 42A of the source-side router 32A, but will be dropped by the source hypervisor 16A.

After the virtual machine is instantiated at the destination computing device 12B and attached to the destination hypervisor 16B, the second set of packets arriving at (M) will be received and processed by the virtual machine 22, and as shown at (N), a second set of response packets 39B will be transmitted back through the virtual switch or L2 bridge 19B, network interface card 21B, network device 41B, destination-side router 32B, and as shown at (0), to the requesting client 12C. The first set of response packets 39A are responses to the first set of inbound request packets 38A that are not dropped at the source computing device 12A, and the second set of response packets 39B are for the second set of inbound request packets 38B that are not dropped at the destination computing device 12B. It will be appreciated that, for purposes of illustration, the second set of response packets 39B are shown at (0) as traversing the source-side router 32A. However, the EVPN 44A could alternatively route the second set of response packets 39B to the requesting client device 12C along another path.

The completion of the migration of the virtual machine 22 to the destination computing device may be detected by the control plane 34A, 34B of the overlay network (e.g., EVPN) 44A upon receipt of the first traffic from the virtual machine 22 executed at the destination computing device 12B.

Following the completion of the migration of the virtual machine 22 to the destination hypervisor 16B, as shown at (P), the destination hypervisor 16B sends a post-migration notification 40 to the source-side router 32A instructing the source-side router 32A to modify the rules 42 to cancel the duplication of packets 38. The post-migration notification 40 may be a gratuitous ARP (Address Resolution Protocol) request, for example. Responsive to receiving the post-migration notification 40, the source-side router 32A may update the network routing tables 42A1 in the rules 42 to update the router IP address of the newly migrated virtual machine 22 to the destination router IP address (e.g., TEP address), so that network traffic is forwarded taking into account that new location of the virtual machine 22 on the destination hypervisor 16B. At (Q), the updated routing table 42A2 is shown, in which the first entry for the virtual machine identification to source router IP address mapping is deleted. Responsive to the destination hypervisor 16B sending the post-migration notification 40 to the source-side router 32A, the registration of the attachment of the virtual machine 22 to the source hypervisor 16A may be terminated by virtue of updating the rules 42 to cease the duplication rule 42A by updating the routing table in the manner shown at (Q) to delete the source router IP address, thereby ending packet duplication. After this step, packets 38 bound for the virtual machine 22 will only be transmitted along the path through the destination-side router 32B to the destination hypervisor 16B for processing.

With the above-described system, when the virtual machine is not instantiated on the destination hypervisor, the destination hypervisor drops at least a portion of the second set of packets, but the dropped portion of second set of packets has corresponding duplicate packets in the first set of packets that are received by the virtual machine instantiated at the source hypervisor. Likewise, when the virtual machine is not instantiated on the source hypervisor, the source hypervisor drops at least a portion of the first set of packets, but the dropped portion of first set of packets has corresponding duplicate packets in the first set of packets that are received by the virtual machine instantiated at the destination hypervisor. In this way, the problem of dropped packets in the aggregate is avoided.

Figure 3:
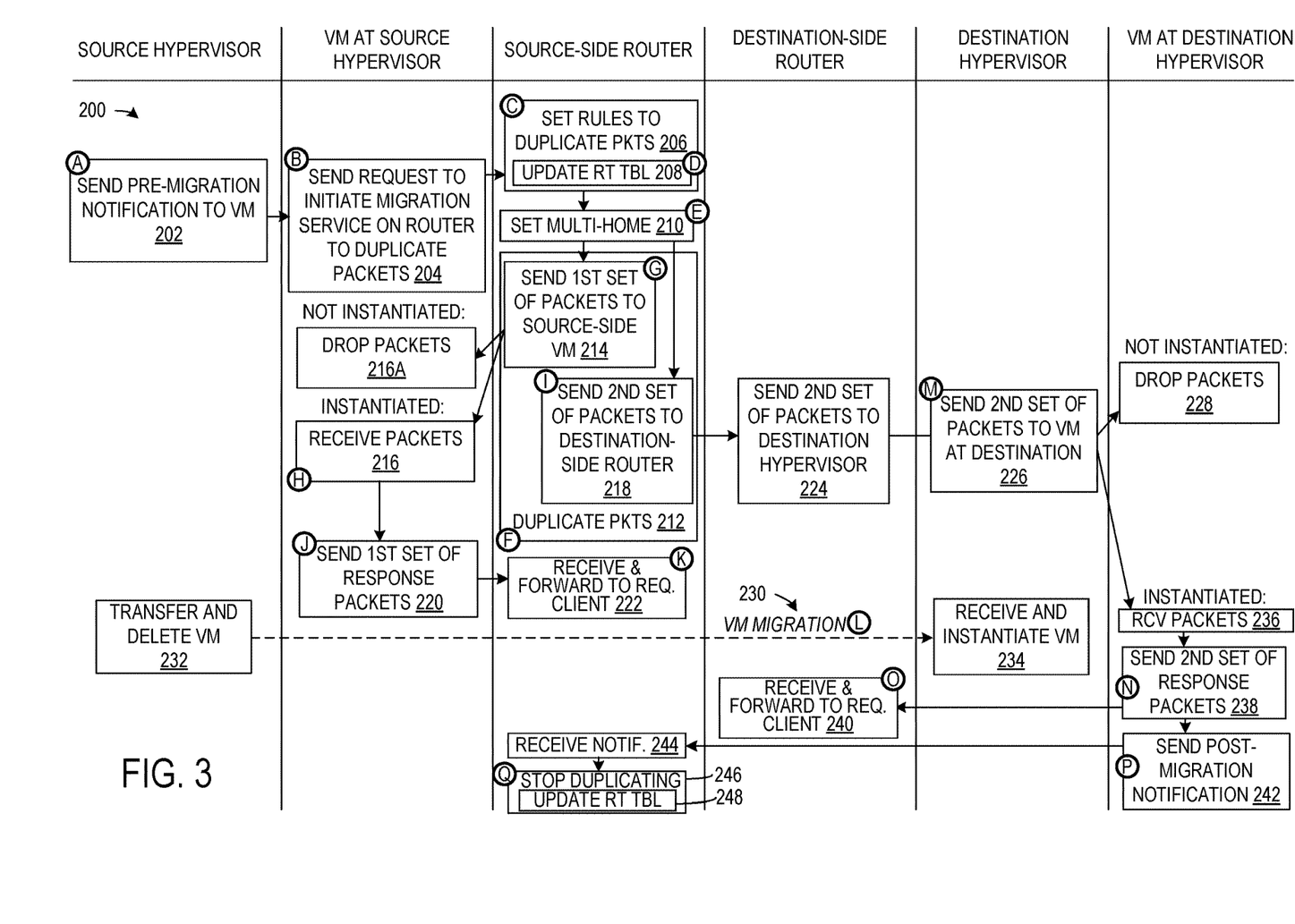
FIG. 3 depicts a flowchart illustrating an example method according to one example of the present disclosure.

FIG. 3 illustrates a flowchart of a computerized method 200 for migrating a virtual machine from a source hypervisor to a destination hypervisor. The following description of computerized method 200 is provided with reference to the software and hardware components described above and shown in FIG. 2. For the aid of understanding labels (A)-(Q) are provided in FIG. 3 to show the correspondence of method steps with the functions performed by the software and hardware components described in FIG. 2. However, it will be appreciated that computerized method 200 also may be performed in other contexts using other suitable hardware and software components. Thus, FIG. 3 will be described using reference to steps 202 through 240 of method 200, rather than labels (A)-(Q) specific to the system of FIG. 2.

Method 200 includes, at step 202, at a source hypervisor executed on a source computing device of a distributed computing system, sending a pre-migration notification to a virtual machine that is executed at the source hypervisor. At step 204, the virtual machine executed at the source hypervisor sends a request to the source-side router to initiate a migration service on the source-side router to duplicate packets ingressing into a source-side router. At step 206, the source-side router sets up and executes rules to start duplicating the packets ingressing into the source-side router so that the packets become a first set of packets and a second set of packets, the first and second sets of packets being identical to each other. As described above and illustrated at step 208, this may be accomplished by updating a routing table of the source-side router to include a pair of entries mapping a VM identifier for the virtual machine to an IP address of the source-side router, and mapping the VM identifier to the IP address of the destination-side router. At step 210, the source-side router and destination-side router, which are part of an overlay network such as an EVPN, are configured with a multi-homing configuration setting for the virtual machine, indicating that the virtual machine is attached to both the source computing device and source hypervisor and to the destination computing device and destination hypervisor, to prevent the automatic return of forwarded packets as discussed above. At step 212, the duplicated packets are concurrently sent to both the source-side router and destination-side router according to the entries in the routing table updated at step 208. Thus, at 214, the method includes the source-side router sending the first set of packets to the virtual machine executed at the source hypervisor on the source computing device, and at step 216, when the virtual machine is determined to be instantiated at the source hypervisor, the virtual machine executed at the source hypervisor receives the first set of packets. Further, at step 218, substantially concurrently with step 214, the method includes the source-side router sending the second set of packets to the destination-side router. At step 224, the destination-side router sends the second set of packets to the destination hypervisor executed on the destination computing device. At 226, the destination hypervisor attempts to send the second set of packets to the destination VM at the destination hypervisor.

After the packets are sent to each hypervisor, each hypervisor checks to see whether the virtual machine to which the packets were destined, is currently instantiated on the hypervisor. Pre-migration, the virtual machine is not instantiated at the destination hypervisor, and post-migration, the virtual machine is not instantiated at the source hypervisor. Thus, at step 216A, after the first set of packets are sent from the source-side router, the method includes, when the source hypervisor determines that the virtual machine is not instantiated, dropping at least a portion of the first set of packets after arrival at the source computing device. It will be appreciated that a portion of the first set of packets is typically received pre-migration and a portion of the first set of packets is usually dropped post-migration at the source computing device, since the virtual machine has been deleted from the source computing device.

At 220, the method includes, at the virtual machine at the source hypervisor, processing the received portion of the first set of packets and sending a first set of response packets back to the requesting device. At 222, the first set of response packets is received and forwarded to the requesting client by the source-side router.

Turning now to step 228, if the destination hypervisor determines that the virtual machine is not instantiated at the destination hypervisor when it attempts to send the second set of packets to the VM at step 226, then the packets are dropped at the second computing device, as shown at 228. This typically occurs pre-migration, such that at least a portion of the second set of packets is dropped at the second computing device prior to the completion of migration.

At 230, the method includes migrating the virtual machine from the source hypervisor at the source computing device to the destination hypervisor at the destination computing device. This includes, at 232, transferring the virtual machine from the source hypervisor and deleting the virtual machine from the source computing device. This further includes, at 234, receiving an instantiating the virtual machine at the destination hypervisor at the destination computing device. Once determining that the virtual machine is instantiated at the destination computing device (i.e., that the migration has finished), the destination hypervisor can forward a portion of the second set of packets it receives to the virtual machine. Thus, responsive to determining that the virtual machine has finished the migration, i.e., repeating step 226 under these new conditions, the destination hypervisor sends the second set of packets to the virtual machine executed at the destination hypervisor. At step 236, the virtual machine executed at the destination hypervisor receives the second set of packets. At 238, the virtual machine processes the second set of packets, and generates and sends a second set of response packets to the destination-side router. At step 240, the method includes receiving the second set of response packets at the destination-side router, and forwarding them to the requesting client. At 242, also in response to determining that the migration of the virtual machine to the destination hypervisor has finished, the method includes the destination hypervisor sending a post-migration notification to the source-side router, instructing the source-side router to modify the rules to cancel the duplication of packets. Typically the determination that the migration is finished is made by detecting that the migrated and instantiated virtual machine has sent a communication out to the computer network from the destination hypervisor.

At step 244, the source-side router receives the post-migration notification, and at step 246, the source-side router modifies the rules to cancel the duplication of packets. As shown at 248, the modification of the rules to stop duplication of packets is typically accomplished by updating the routing table to remove the entry that maps the virtual machine identifier to the source-side router IP address.

The above-described system and methods allow a virtual machine to be migrated across computing devices and across hypervisors within a distributed computing system with minimal packet loss and delay. The configuration of a routing table that defines dual pathways for duplicated packets to be delivered to the computing devices that will execute the virtual machine pre- and post-migration, during the migration process, provides redundancies which reduce the risk of dropped packets. Two fictions are involved to configure the system in this manner. The first is that two routing table entries are concurrently maintained indicating that the VM is instantiated at each of the source and destination hypervisors, when the VM is only actually instantiated at one hypervisor at a time. The second is that the configuration of the computer network to include an overlay network and the registration of the virtual machine as being attached to two hypervisors concurrently using a multi-homing configuration setting help avoid automatic return of misrouted packets, despite the fact that the virtual machine is not actually instantiated at both hypervisors concurrently. Configuration of the distributed computing system in the above-described manner will reduce dropped packets, reducing errors, downtime, and processing delay.

Figure 4:
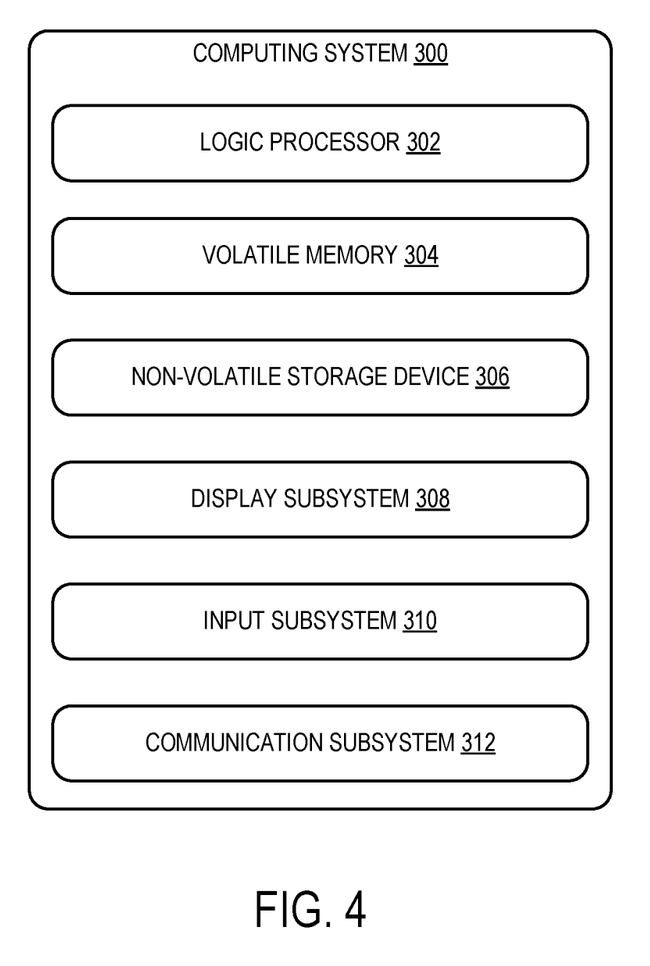
FIG. 4 depicts a block diagram of an example computing system that may be used to implement the distributed computing system of FIG. 2.

FIG. 4 schematically shows a non-limiting embodiment of a computing system 300 that can enact one or more of the methods and processes described above. Computing system 300 is shown in simplified form. Computing system 300 may embody the computing devices 12A, 12B, 12C described above and illustrated in FIG. 2. Computing system 300 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 300 includes a logic processor 302, volatile memory 304, and a non-volatile storage device 306. Computing system 300 may optionally include a display subsystem 308, input subsystem 310, communication subsystem 312, and/or other components not shown in FIG. 4.

Logic processor 302 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 302 may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built in. Non-volatile storage device 306 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Volatile memory 304 may include physical devices that include random access memory. Volatile memory 304 is typically utilized by logic processor 302 to temporarily store information during processing of software instructions. It will be appreciated that volatile memory 304 typically does not continue to store instructions when power is cut to the volatile memory 304.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 typically implemented in software by a processor to perform a particular function using portions of volatile memory, which function involves transformative processing that specially configures the processor to perform the function. Thus, a module, program, or engine may be instantiated via logic processor 302 executing instructions held by non-volatile storage device 306, using portions of volatile memory 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 308 may be used to present a visual representation of data held by non-volatile storage device 306. The visual representation may take the form of a graphical user interface (GUI). As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

When included, input subsystem 310 may comprise or interface with one or more user-input devices such as a keyboard, mouse, touch screen.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 300 to send and/or receive messages to and/or from other devices via a network such as the Internet.

The following paragraphs provide additional description of the disclosed systems and methods. According to an aspect of the present disclosure, a distributed computing system is provided comprising a source computing device implementing a source hypervisor executing a virtual machine, a source-side router coupled to the source hypervisor, a destination computing device implementing a destination hypervisor, and a destination-side router coupled to the destination hypervisor. The source hypervisor is connected to the destination hypervisor through a network and during a migration of the virtual machine from the source hypervisor to the destination hypervisor, the source-side router duplicates packets ingressing into the source-side router, the duplicated packets comprising a first set of packets and a second set of packets, the first set of packets is routed to the virtual machine through the source hypervisor on the network, and the second set of packets is routed to the virtual machine through the destination hypervisor on the network. Typically the first set of packets are not routed to the virtual machine through the second hypervisor. In this aspect, the virtual machine can be indicated in the network as being attached to each of the source-side router and the destination-side router during an entire duration of the migration of the virtual machine from the source hypervisor to the destination hypervisor. Further, in this aspect, the source-side router and destination-side router can implement a virtual private network overlayed on the network, and the virtual private network can be configured in a multi-homing configuration in which the virtual machine is indicated as being attached to both of the source computing device and the destination computing device. Further in this aspect, the source hypervisor can initiate the migration of the virtual machine from the source hypervisor to the destination hypervisor by sending a pre-migration notification to the virtual machine executed at the source hypervisor, and responsive to receiving the pre-migration notification, the virtual machine can send a request to the source-side router to initiate a migration service. Further in this aspect, responsive to receiving the request, the source-side router can initiate the migration service to set up and execute a rule to duplicate the packets ingressing into the source-side router. Further in this aspect, the rule can be a duplication rule implemented via a routing table including a mapping of a virtual machine identifier identifying the virtual machine to a source-side router IP address of the source-side router, and a mapping of the virtual machine identifier to a destination-side router IP address of the destination-side router. Still further in this aspect, the virtual private network can be an Ethernet Virtual Private Network (EVPN), and the routing table is an L2 routing table of the EVPN. Additionally in this aspect, the duplication of packets can be canceled by the source-side router by the source-side router updating the routing table to cancel the mapping of the virtual machine identifier to the source-side router IP address. Further in this aspect, the destination hypervisor can determine whether the virtual machine has migrated to the destination hypervisor, and responsive to determining that the virtual machine has migrated to the destination hypervisor, the destination hypervisor can route the second set of packets to the virtual machine executed at the destination hypervisor. Still further in this aspect, when the virtual machine is not instantiated on the destination hypervisor, the destination hypervisor drops at least a portion of the second set of packets, and the dropped portion of the second set of packets has corresponding duplicate packets in the first set of packets that are received by the virtual machine instantiated at the source hypervisor. Additionally in this aspect, when the virtual machine is not instantiated on the source hypervisor, the source hypervisor drops at least a portion of the first set of packets, and the dropped portion of the first set of packets has corresponding duplicate packets in the first set of packets that are received by the virtual machine instantiated at the destination hypervisor. Further in this aspect, responsive to determining that the virtual machine has migrated to the destination hypervisor, the destination hypervisor can send a post-migration notification to the source-side router instructing the source-side router to cancel the duplication of the packets. Still further in this aspect, the post-migration notification can be an Address Resolution Protocol (ARP) request.

According to another aspect, a method for migrating a virtual machine from a source hypervisor to a destination hypervisor is provided, the source hypervisor and destination hypervisor connected to each other through a network via a source-side router coupled to the source hypervisor and a destination-side router coupled to the destination hypervisor, the method comprising: initiating the migration of the virtual machine from the source hypervisor to the destination hypervisor by sending a pre-migration notification to the virtual machine to the virtual machine executed at the source hypervisor, causing the virtual machine to send a request to the source-side router to initiate a migration service to start duplicating packets, duplicating the packets ingressing into the source-side router, the duplicated packets comprising a first set of packets and a second set of packets, routing the first set of packets to the virtual machine through the source hypervisor, and routing the second set of packets to the virtual machine through the destination hypervisor on the network. Typically, the first set of packets are not routed to the virtual machine through the second hypervisor. In this aspect, the method can include maintaining within the network an indication of an attachment of the virtual machine to the source hypervisor and the destination hypervisor during an entire duration of the migration of the virtual machine from the source hypervisor to the destination hypervisor. In this aspect, the method can include configuring the source-side router and destination-side router to implement a virtual private network overlayed on the network, the virtual private network being configured in a multi-homing configuration in which the virtual machine is indicated as being attached to both of a source computing device and a destination computing device. In this aspect, the method can include initiating the migration of the virtual machine from the source hypervisor to the destination hypervisor by sending the pre-migration notification to the virtual machine executed at the source hypervisor, and based on at least receiving the pre-migration notification, executing a rule to duplicate the packets ingressing into the source-side router. In this aspect, the rule can be a duplication rule implemented via a routing table including a mapping of a virtual machine identifier identifying the virtual machine to a source-side router IP address of the source-side router, and a mapping of the virtual machine identifier to a destination-side router IP address of the destination-side router. In this aspect, the method can further include sending a post-migration notification to the source-side router instructing the source-side router to cancel the duplication of the packets, responsive to determining that the virtual machine has migrated to the destination hypervisor. In this aspect, the post-migration notification can be an Address Resolution Protocol (ARP) request.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

It will be appreciated that "and/or" as used herein refers to the logical disjunction operation, and thus A and/or B has the following truth table.

| A | B | A and/or B |
|---|---|---|
| T | T | T |
| T | F | T |
| F | T | T |
| F | F | F |

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A distributed computing system, comprising:
   a source computing device implementing a source hypervisor executing a virtual machine;
   a source-side router coupled to the source hypervisor;
   a destination computing device implementing a destination hypervisor; and
   a destination-side router coupled to the destination hypervisor, wherein
   the source hypervisor is connected to the destination hypervisor through a network; and
   during a migration of the virtual machine from the source hypervisor to the destination hypervisor,
      the source-side router duplicates packets ingressing into the source-side router, the duplicated packets comprising a first set of packets and a second set of packets;
      the first set of packets is routed to the virtual machine through the source hypervisor on the network; and
      the second set of packets is routed to the virtual machine through the destination hypervisor on the network.

2. The distributed computing system of claim 1, wherein the virtual machine is indicated in the network as being attached to each of the source-side router and the destination-side router during an entire duration of the migration of the virtual machine from the source hypervisor to the destination hypervisor.

3. The distributed computing system of claim 2, wherein the source-side router and destination-side router implement a virtual private network overlayed on the network, the virtual private network being configured in a multi-homing configuration in which the virtual machine is indicated as being attached to both of the source computing device and the destination computing device.

4. The distributed computing system of claim 3, wherein the source hypervisor initiates the migration of the virtual machine from the source hypervisor to the destination hypervisor by sending a pre-migration notification to the virtual machine executed at the source hypervisor; and
   responsive to receiving the pre-migration notification, the virtual machine sends a request to the source-side router to initiate a migration service.

5. The distributed computing system of claim 4, wherein responsive to receiving the request, the source-side router initiates the migration service to set up and execute a rule to duplicate the packets ingressing into the source-side router.

6. The distributed computing system of claim 5, wherein the rule is a duplication rule implemented via a routing table including a mapping of a virtual machine identifier identifying the virtual machine to a source-side router IP address of the source-side router, and a mapping of the virtual machine identifier to a destination-side router IP address of the destination-side router.

7. The distributed computing system of claim 6, wherein the virtual private network is an Ethernet Virtual Private Network (EVPN); and
   the routing table is an L2 routing table of the EVPN.

8. The distributed computing system of claim 6, wherein the duplication of packets is canceled by the source-side router by the source-side router updating the routing table to cancel the mapping of the virtual machine identifier to the source-side router IP address.

9. The distributed computing system of claim 5, wherein responsive to determining that the virtual machine has migrated to the destination hypervisor, the destination hypervisor sends a post-migration notification to the source-side router instructing the source-side router to cancel the duplication of the packets.

10. The distributed computing system of claim 9, wherein the post-migration notification is an Address Resolution Protocol (ARP) request.

11. The distributed computing system of claim 1, wherein
the destination hypervisor determines whether the virtual machine has migrated to the destination hypervisor; and
responsive to determining that the virtual machine has migrated to the destination hypervisor, the destination hypervisor routes the second set of packets to the virtual machine executed at the destination hypervisor.

12. The distributed computing system of claim 1, wherein when the virtual machine is not instantiated on the destination hypervisor, the destination hypervisor drops at least a portion of the second set of packets; and
the dropped portion of the second set of packets has corresponding duplicate packets in the first set of packets that are received by the virtual machine instantiated at the source hypervisor.

13. The distributed computing system of claim 1, wherein when the virtual machine is not instantiated on the source hypervisor, the source hypervisor drops at least a portion of the first set of packets; and
the dropped portion of the first set of packets has corresponding duplicate packets in the first set of packets that are received by the virtual machine instantiated at the destination hypervisor.

14. A method for migrating a virtual machine from a source hypervisor to a destination hypervisor, the source hypervisor and destination hypervisor connected to each other through a network via a source-side router coupled to the source hypervisor and a destination-side router coupled to the destination hypervisor, the method comprising:
initiating the migration of the virtual machine from the source hypervisor to the destination hypervisor by sending a pre-migration notification to the virtual machine to the virtual machine executed at the source hypervisor, causing the virtual machine to send a request to the source-side router to initiate a migration service to start duplicating packets;
duplicating the packets ingressing into the source-side router, the duplicated packets comprising a first set of packets and a second set of packets;
routing the first set of packets to the virtual machine through the source hypervisor; and
routing the second set of packets to the virtual machine through the destination hypervisor on the network.

15. The method of claim 14, further comprising maintaining within the network an indication of an attachment of the virtual machine to the source hypervisor and the destination hypervisor during an entire duration of the migration of the virtual machine from the source hypervisor to the destination hypervisor.

16. The method of claim 15, further comprising configuring the source-side router and destination-side router to implement a virtual private network overlayed on the network, the virtual private network being configured in a multi-homing configuration in which the virtual machine is indicated as being attached to both of a source computing device and a destination computing device.

17. The method of claim 16, further comprising:
initiating the migration of the virtual machine from the source hypervisor to the destination hypervisor by sending the pre-migration notification to the virtual machine executed at the source hypervisor; and
based on at least receiving the pre-migration notification, executing a rule to duplicate the packets ingressing into the source-side router.

18. The method of claim 17, wherein the rule is a duplication rule implemented via a routing table including a mapping of a virtual machine identifier identifying the virtual machine to a source-side router IP address of the source-side router, and a mapping of the virtual machine identifier to a destination-side router IP address of the destination-side router.

19. The method of claim 18, further comprising sending a post-migration notification to the source-side router instructing the source-side router to cancel the duplication of the packets, responsive to determining that the virtual machine has migrated to the destination hypervisor.

20. The method of claim 19, wherein the post-migration notification is an Address Resolution Protocol (ARP) request.

* * * * *